United States Patent
Archambeau et al.

(10) Patent No.: US 9,977,259 B2
(45) Date of Patent: *May 22, 2018

(54) METHOD OF CONTROLLING A PROGRAMMABLE LENS DEVICE

(71) Applicant: Essilor International (Compagnie Generale d'Optique)

(72) Inventors: Samuel Archambeau, Charenton-le-Pont (FR); David Escaich, Charenton-le-Pont (FR); Romain Fayolle, Charenton-le-Pont (FR); Stephane Perrot, Charenton-le-Pont (FR); Jean-Paul Cano, Charenton-le-Pont (FR); Cyril Guilloux, Charenton-le-Pont (FR); Benoit Callier, Charenton-le-Pont (FR); Vincent Yquel, Charenton-le-Pont (FR); Jérôme Ballet, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 110 days.

This patent is subject to a terminal disclaimer.

(21) Appl. No.: 14/909,026

(22) PCT Filed: Jul. 30, 2014

(86) PCT No.: PCT/EP2014/066425
§ 371 (c)(1),
(2) Date: Jan. 29, 2016

(87) PCT Pub. No.: WO2015/014910
PCT Pub. Date: Feb. 5, 2015

(65) Prior Publication Data
US 2016/0161766 A1 Jun. 9, 2016

(30) Foreign Application Priority Data

Aug. 2, 2013 (EP) .................... 13306116

(51) Int. Cl.
*G02C 7/04* (2006.01)
*G02C 7/08* (2006.01)
(Continued)

(52) U.S. Cl.
CPC ......... *G02C 7/083* (2013.01); *G02B 27/0172* (2013.01); *G02C 7/027* (2013.01);
(Continued)

(58) Field of Classification Search
CPC .................................................. G02C 7/083
(Continued)

(56) References Cited

U.S. PATENT DOCUMENTS

2004/0027501 A1   2/2004  Blum et al.
2004/0056986 A1*  3/2004  Blum .............. G02C 7/022
                                              349/13
(Continued)

FOREIGN PATENT DOCUMENTS

WO    2011153112 A2    12/2011

OTHER PUBLICATIONS

International Search Report and Written Opinion dated Sep. 17, 2014; International PCT Application No. PCT/EP2014/066425.
(Continued)

*Primary Examiner* — Hung Dang
(74) *Attorney, Agent, or Firm* — McGuireWoods LLP (57) ABSTRACT

A method of controlling a programmable lens device comprising a programmable lens and an optical function controller, the programmable lens having an optical function and extending between at least one eye of the wearer and the real world scene when the device is used by the wearer, and the optical function controller being arranged to control the optical function of the programmable lens, the method comprising: an optical function data receiving step during which optical function data relating to the optical function of
(Continued)

the programmable lens is received by the optical function controller, an optical function modifying step during which the optical function of the programmable electronic lens device is modified by the optical function controller based on the optical function data.

16 Claims, 3 Drawing Sheets

(51) Int. Cl.
  *G02C 7/06* (2006.01)
  *G02C 7/02* (2006.01)
  *G02B 27/01* (2006.01)
  *G02C 11/00* (2006.01)
(52) U.S. Cl.
  CPC .............. *G02C 7/061* (2013.01); *G02C 7/066* (2013.01); *G02C 7/081* (2013.01); *G02C 11/10* (2013.01); *G02B 2027/014* (2013.01); *G02B 2027/0178* (2013.01)

(58) Field of Classification Search
  USPC ...... 351/159.01, 159.03, 159.39, 159.73, 41, 351/158; 349/13
  See application file for complete search history.

(56) References Cited

U.S. PATENT DOCUMENTS

| | | |
|---|---|---|
| 2005/0036109 A1 | 2/2005 | Blum et al. |
| 2007/0019279 A1 | 1/2007 | Goodall et al. |
| 2008/0212025 A1 | 9/2008 | Baumann et al. |
| 2012/0127422 A1 | 5/2012 | Tian et al. |
| 2012/0194781 A1 | 8/2012 | Agurok |
| 2013/0021658 A1 | 1/2013 | Miao et al. |

OTHER PUBLICATIONS

International Search Report and Written Opinion dated Sep. 17, 2014; International PCT Application No. PCT/EP2014/066426.

* cited by examiner

METHOD OF CONTROLLING A PROGRAMMABLE LENS DEVICE

The invention relates to a method of controlling a programmable lens device comprising a programmable lens and an optical function controller, the programmable lens having an optical function and extending between at least one eye of the wearer and the real world scene when the device is used by the wearer, and the optical function controller being arranged to control the optical function of the programmable lens. The invention further relates to a network system comprising at least a programmable lens and a distant entity, and to a computer program product comprising one or more stored sequences of instructions that are accessible to an optical function controller of a programmable lens device.

The discussion of the background of the invention herein is included to explain the context of the invention. This is not to be taken as an admission that any of the material referred to was published, known or part of the common general knowledge at the priority date of any of the claims.

Usually, an eyewear equipment wearer wishing to have an eyewear equipment goes to see an eye care practitioner.

The eye care practitioner orders the eyewear equipment at a lens manufacturing lab, hereafter lab, by sending an order request to the lab.

The lab receives the order request and sends it to a calculating entity that calculates based on the order request an optical lens design. The optical design determined is sent to the lab and the optical lenses are manufactured based on the calculated design.

The optical lenses are then sent to the eye care practitioner.

The current optical lens delivering process presents some drawbacks.

In the recent years, new optical designs have been invented. These new optical designs are more and more personalized according to the wearer, the viewing conditions and the type of activity of the wearer.

Indeed, the optical requirements may be different depending on the viewing conditions and the activity of the wearer. For example, the optical requirements are different when the wearer is reading a book and when the wearer is looking at a landscape. Multifocal ophthalmic lenses have been develop to provide a single pair of ophthalmic lenses providing ophthalmic correction for near and far vision distances.

However, the ophthalmic lens designers are known able to provide optical designs that are more and more specific to a type of activity and viewing conditions.

Therefore, depending on the different activity the wearer may do in a day he may benefit from using different ophthalmic lens designs.

However, at the time being a wearer wanting to have access to more suitable optical designs adapted to his/her different activities or wanting to change ophthalmic lens design has to carry with him/her as many pair of spectacle lenses as the number of optical designs he/her wishes to have.

Thus, there is a need to improve the process of providing to the wearer new and most adapted ophthalmic lens designs that does not require for the wearer to carry with him a great number of pair of spectacle lenses.

An aim of the present invention is to propose a method of controlling a programmable lens device so as to adapt the programmable lens device to selected ophthalmic lens designs.

To this end, the present invention relates to a method of controlling a programmable lens device comprising a programmable lens and an optical function controller, the programmable lens having an optical function and extending between at least one eye of the wearer and the real world scene when the device is used by the wearer, and the optical function controller being arranged to control the optical function of the programmable lens, the method comprising:
  an optical function data receiving step during which optical function data relating to the optical function of the programmable lens is received by the optical function controller,
  an optical function modifying step during which the optical function of the programmable electronic lens device is modified by the optical function controller based on the optical function data.

Advantageously, the method according to the invention allows providing different optical lens designs to the wearer without having to change the equipment the user is wearing. Therefore, the wearer may have a single equipment comprising programmable lenses, the optical function of the programmable lenses being adapted based on the optical function data.

According to further embodiments which can be considered alone or in combination:
  the optical function data comprise a computer program adapted to be executed by the optical function controller and during the optical function modifying step the received computer program is executed by the optical function controller so as to modify the optical function of the programmable optical lens; and/or
  the optical function provides at least an ophthalmic correction adapted to the wearer; and/or
  the optical function data comprise at least dioptric function data relating to a dioptric function based at least on the ophthalmic correction adapted to the wearer; and/or
  the dioptric function data relate a progressive multifocal optical design; and/or
  the method further comprises a viewing condition data receiving step during which viewing condition data relating to the viewing condition of the wearer are received by the optical function controller, and during the optical function modifying step the optical function is modified based on the viewing condition data; and/or
  the viewing condition comprise the sighting distance of the wearer; and/or
  the viewing condition comprise the proximity of the objects in the wearer's environment; and/or
  the viewing condition comprise the luminosity of the wearer's environment; and/or
  the viewing condition comprise elements relating to the posture of the wearer; and/or
  the method further comprises an activity data receiving step during which activity data relating to the activity of the wearer are received by the optical function controller, and during the optical function modifying step the optical function is modified based on the activity data; and/or
  the activity of the wearer is selected in the list comprising reading, computing, running, walking, driving, watching TV/screen; and/or
  the method further comprises an initializing step during which the optical function of the programmable lens device is initialized based on user data comprising at least the wearer's ophthalmic prescription; and/or
  the user data further comprise morphologic data relating to the morphology of the head of the wearer and/or viewing strategy data relating to the viewing strategy of the wearer and/or lens usage and/or wearer preferences and/or the user's profile used for a previous equipment; and/or the optical function data are received from a distant entity; and/or the viewing condition data and/or activity data and/or user data are sent to the distant entity and the optical function data are adapted based on said data; and/or the device further comprises a visual information display device arranged to display visual information over the real world scene viewed by the wearer through the programmable lens when the programmable lens device is used by the wearer, and a visual information display controller arranged to electronically control the display of the visual information, and the method further comprises a display modifying step during which the displayed information is adapted based on the viewing condition data and/or the user data and/or the activity data and/or the optical function data; and/or the data are encrypted.

The invention also relates to a network system comprising at least a programmable lens device and a distant entity, the programmable lens device and the distant entity being configured so as to communicate one with the other, and the distant entity comprising storing means adapted to store at least one computer program product comprising one or more stored sequences of instructions that when executed by the optical function controller of the programmable lens device, causes the optical function controller to adapt the optical function at least according to the user's ophthalmic prescription.

The invention further relates to a network system comprising at least a programmable lens device and a distant entity, the programmable lens device and the distant entity being configured so as to communicate one with the other, and the distant entity comprising storing means adapted to store dioptric functions, for example optical designs, for example in a data base.

According to a further aspect, the invention relates to a computer program product comprising one or more stored sequences of instructions that are accessible to a processor and which, when executed by the processor, causes the processor to carry out the steps of the method according to the invention.

The invention further relates to a computer readable medium carrying one or more sequences of instructions of the computer program product according to the invention. Furthermore, the invention relates to a program which makes a computer execute the method of the invention.

The invention also relates to a computer-readable storage medium having a program recorded thereon; where the program makes the computer execute the method of the invention.

The invention further relates to a device comprising a processor adapted to store one or more sequence of instructions and to carry out at least one of the steps of the method according to the invention.

Unless specifically stated otherwise, as apparent from the following discussions, it is appreciated that throughout the specification discussions utilizing terms such as "computing", "calculating", "generating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or a Field Programmable Gate Array ("FPGA") or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

Other features and advantages of the present invention will become apparent from the following description of non-limitative embodiments, with reference to the attached drawing in which.

Figure 1:
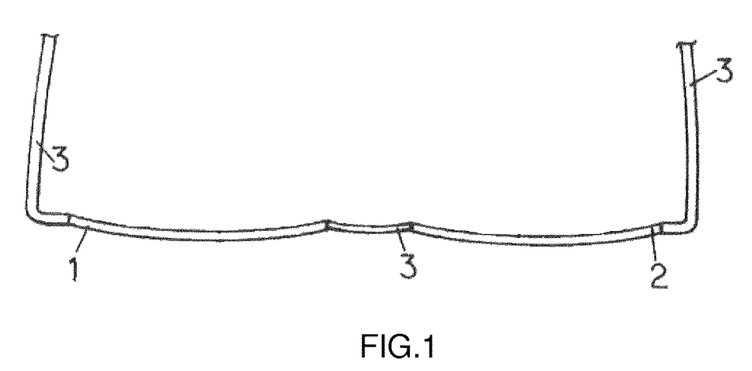
FIG. 1 illustrates a programmable lens device used in a method according to the invention.

The present invention relates to a method of controlling a programmable lens device, an example of programmable lens device is represented on FIG. 1.

The programmable lens device represented on FIG. 1 comprises a frame 3 and two programmable lenses, respectively denoted 1 and 2 for the right and left lens. The frame 3 holds the lenses 1 and 2 in relative fixed positions, and allows placing them is front of the eyes of the wearer in a manner which remains substantially constant during successive period of use. The lenses 1 and 2 can be permanently assembled into the frame 3 using one of the assembly methods known to opticians.

The programmable lenses 1 and 3 are lenses whose optical function can be controlled by an optical function controller.

In the sense of the invention, the optical function corresponds to a function providing for each gaze direction the effect of the optical lens on the light ray passing through the optical lens.

The optical function may comprise as dioptric function, light absorption, polarizing capability, reinforcement of contrast capacity, etc. . . . . .

The dioptric function corresponds to the optical lens power (mean power, astigmatism etc. . . . ) as a function of the gaze direction.

The wording "optical design" is a widely used wording known from the man skilled in the art in ophthalmic domain to designate the set of parameters allowing to define a dioptric function of an ophthalmic lens; each ophthalmic lens designer has its own designs, particularly for progressive ophthalmic lenses. As for an example, a progressive ophthalmic lens "design" results of an optimization of a progressive surface so as to restore a presbyope's ability to see clearly at all distances but also to optimally respect all physiological visual functions such as foveal vision, extra-foveal vision, binocular vision and to minimize unwanted astigmatisms. For example, a progressive lens design comprises:

a power profile along the main gaze directions (meridian line) used by the lens wearer during day life activities, distributions of powers (mean power, astigmatism, . . . ) on the sides of the lens, that is to say away from the main gaze direction.

These optical characteristics are part of the "designs" defined and calculated by ophthalmic lens designers and that are provided with the progressive lenses.

Progressive lens "optical designs" are tested through rigorous trials before being commercialized.

In the example of FIG. 1, the lenses 1 and 2 comprise a set of cells juxtaposed parallel to a surface of each optical lens, forming so called pixelated optical elements.

Such pixelated optical element can also have various optical functions, such as dioptric function, light absorption, polarizing capability, reinforcement of contrast capacity, etc. . . . .

The dioptric function of the optical element can be characterized by an optical phase-shift distribution for a given monochromatic light wave which crosses the optical element.

In a general way, the transparent optical element has a surface which extends transversally compared to an optical axis. An average direction of propagation of the light wave can then be selected to be superimposed on this axis, and the optical phase-shift distribution can be given inside the surface element.

In case of pixelates optical elements, optical phase-shift has discrete values which are carried out in point which constitute a sampling of the useable surface of the transparent optical element.

It is well-known that optical phase-shift $\Delta\varphi$ for a monochromatic light wave is equal to the product of the double of number pi by the length of crossing L of each cell, and by the difference between the value n of refraction index of the transparent material which fills the cell and the value of the air refraction index and by the inverse wavelength $\lambda$. In other words:

A way of carrying out the transparent optical element can then consist in varying the refraction index value of fill material of the cells between different cells of the optical element. In this case, all the cells can have the same depth, which is measured according to the optical axis of the element.

Figure 2:
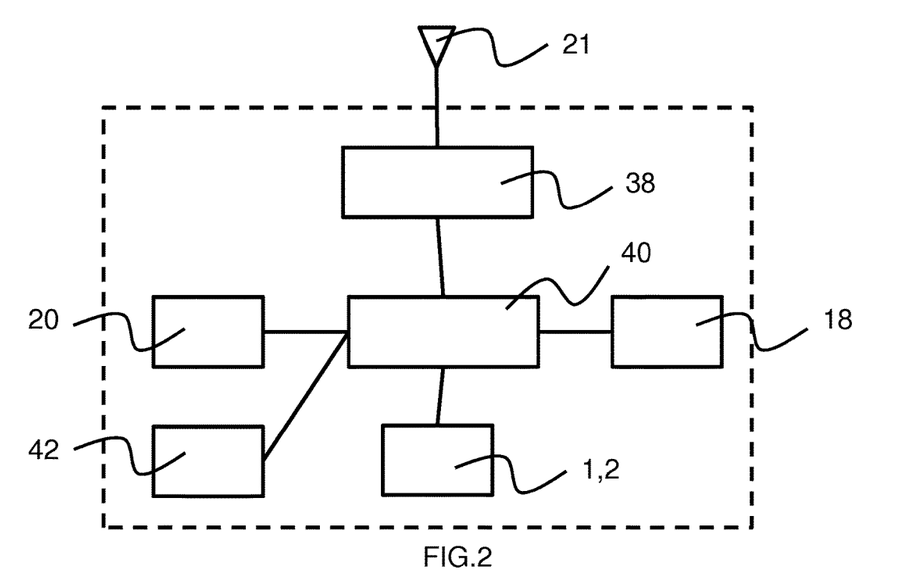
FIG. 2 is a block diagram of the programmable device according to FIG. 1.

Referring to FIG. 2, the programmable lens device may comprise a processing circuit comprising a processor 40. Processor 40 can comprise one or more microprocessors, microcontrollers, and other analog and/or digital circuit components configured to perform the functions described herein. Processor 40 may comprise one or more memories (e.g., random access memory, read only memory, flash, etc.) configured to store software applications provided during manufacture or subsequent to manufacture by the user or by a distributor of the programmable lens device and/or data, for example optical function data.

In one embodiment, processor 40 can comprise an optical function controller configured to run a variety of applications and a second, radio processor on a separate chip or as part of a dual-core chip with the optical function controller.

The radio processor may be configured to operate communication functionality. Programmable lens device can be configured for cellular radio telephone communication, such as Code Division Multiple Access (CDMA), Global System for Mobile Communications (GSM), Third Generation (3G) systems such as Wide-Band CDMA (WCDMA), or other cellular radio telephone technologies. Device 10 can further be configured for data communication functionality, for example, via GSM with General Packet Radio Service (GPRS) systems (GSM/GPRS), CDMA/1×RTT systems, Enhanced Data Rates for Global Evolution (EDGE) systems, Evolution Data Only or Evolution Data Optimized (EV-DO), and/or other data communication technologies.

The programmable lens device 10 comprises a receiver 38 which comprises analog and/or digital electrical components configured to receive and transmit wireless signals via antenna 22 to provide data communications with a fixed wireless access point, such as a cellular telephone tower, in conjunction with a network carrier, such as, Verizon Wireless, Sprint, etc. The programmable lens device 10 can further comprise circuitry to provide communication over a local area network, such as Ethernet or according to an IEEE 802.11x standard or a personal area network, such as a Bluetooth or infrared communication technology.

The programmable lens device 10 may further comprise at least one input device 20. The input device 20 may be controlled by the wearer or correspond to measurements carried out by at least a sensor.

For example, input device may comprises a microphone (not represented) and configured to receive audio signals, such as voice signals, from a user or other person in the vicinity of programmable lens device 10, typically by way of spoken words. The microphone can be coupled to a speech recognition engine. According to such embodiment, the user may provide information concerning the viewing conditions or use the speech recognition engine to order a desired optical design.

The input device 20 may comprise sensors, such as eye tracking devices providing gazing direction and/or gazing distance of the wearer, and/or a postural sensor adapted to determine postural information of the wearer, and/or a movement sensor adapted to determine movement information of the wearer, in particular of the head of the wearer. The input device 20 may comprise a scene camera configured to acquire images of the visual environment of the wearer.

The programmable lens device 10 further comprises a memory 42 coupled to or as part of processor 40. Memory 42 may store a variety of data such as information, data, applications, computer program, files, calibration data, optical design data, etc. . . . that may be used or accessed using the programmable lens device 10.

For example, user data comprising at least the wearer's ophthalmic prescription may be stored in the memory 42.

The user data may comprise morphologic data relating to the morphology of the head of the wearer and/or viewing strategy data relating to the viewing strategy of the wearer and/or lens usage and/or wearer preferences and any other type of data that may be of interest when determining the optical function of the ophthalmic lenses.

Figure 3:
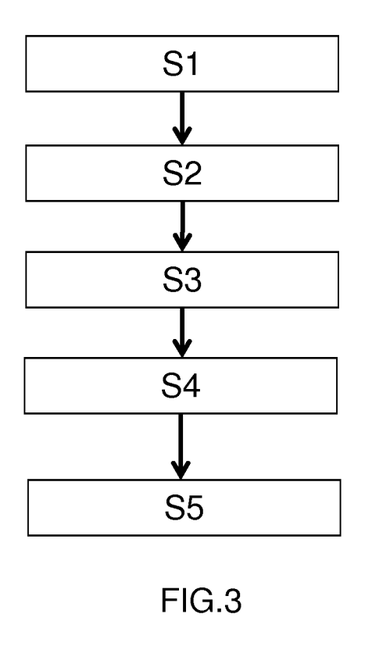
FIG. 3 is a flowchart of different steps of a method according to the invention.

According to an embodiment of the invention illustrated on FIG. 3, the method of the invention comprises:
- an initializing step S1,
- a viewing condition data receiving step S2,
- an activity data receiving step S3,
- an optical function data receiving step S4, and
- an optical function modifying step S5.

During the initializing step S1, the programmable lens device is initialized based on user data. As indicated previously, the user data comprise at least the wearer's prescription.

The user data may comprise further data relating to the user and that may influence the optical function to be applied to the ophthalmic lens. For example, the user data may comprise morphologic data relating to the wearer's head morphology, including for example pupillary distance that may have an influence on the position of the ophthalmic lenses when worn by the wearer.

The user data may comprise viewing strategy of the wearer. For example the user data may comprise the head/eye movement coefficient providing an indication if the user is a head or eye mover.

The user data may comprise information concerning the lens usage and more generally the preferences of the wearer.

According to an embodiment of the invention the user data may be stored in the memory 42 of the programmable lens device, for example after having been encrypted. Typically, the eye care professional may provide the user data in the memory 42 of the programmable lens device.

According to a further embodiment of the invention, the user data may be sent to a distance entity and stored in the distance entity. The user data may be identified using a user identifier stored in the memory 42 of the programmable lens device.

The distance entity may process the user data either to customized the selection of the most appropriate computer program or to determine the most appropriate optical function data, for example the dioptric function data most appropriate to the user.

During the viewing condition data receiving step S2, viewing conditions data are received by the optical function controller. The viewing condition data relate to the viewing condition of the wearer. For example, the viewing condition data may relate to the gazing direction of the wearer obtained using an eye tracking device and can be coupled to the sighting distances. The sighting distance is the distance between the wearer and the object seen by the wearer. The viewing condition may further relate to the posture of the wearer using postural measuring device. The posture of the wearer may include the movements of the wearer.

The viewing conditions may be determined using sensors adapted on the programmable lens device and/or may be provided by the wearer.

According to an embodiment of the invention, the viewing conditions data are stored in the memory 42 of the programmable lens device 10 so as to be used to determine the optical design.

According to a further embodiment of the invention, the viewing conditions data may be sent to a distant entity, either to be stored or to be used to remotely determine the most appropriate optical design. The determination of the optical design may consist in a selection of an optical design in a data base of optical designs stored in the distant entity. The determination of the optical design may consist in a calculation, for example a optimization, of an optical design or a customization or adaptation of an existing optical design.

During the activity data receiving step S3, activity data relating to the wearer's activity are received by the optical function controller.

The activity data may be determined either using sensors provided on the programmable lens device or by information provided by the wearer himself.

For example, the wearer may provide the information that he is about to start reading a book or that he is about to start driving his car.

Such activity information may be stored in the memory or sent to a distant entity and associated with the user data using the user identifier.

During the optical function data receiving step S4, optical function data relating to the optical function of the programmable lens device is received by the optical function controller.

According to an embodiment of the invention, the optical function data may comprise a computer program adapted to be executed by the optical function controller to modify the optical function of the programmable lens. The computer program may be selected among a list or in a database of computer programs based on the user data and/or the viewing data and/or the activity data.

According to a further embodiment of the invention, the optical function data are determined at the distant entity. The optical function data comprising the dioptric function to be applied to the programmable lens is received by the programmable lens device from the distant entity.

According to an embodiment, the determination of the optical function data may comprise a selection of optical function data, for example dioptric function data, in a data base of optical functions, for example of dioptric functions, stored in the distant entity. The selection can be based on the user data and/or viewing condition data and/or activity data.

According to an embodiment, the determination of the optical function data may comprise calculating or optimizing optical function data, for example dioptric function data, at the distant entity. The calculation or optimization can be based on the user data and/or viewing condition data and/or activity data.

The dioptric function may correspond to a progressive multifocal dioptric function, according to such embodiment the optical function data comprise optical design data.

The optical function data may be determined based on the user data, viewing conditions and their short to mid-term history and activity data. For example, based on all the available data the most appropriate optical function to be provided to the user of the programmable lens device is determined and sent to the optical function controller.

According to an embodiment of the invention the most appropriate optical design corresponding to the optical function data may be determining using a computer program stored in the memory 42 of the programmable lens device.

Figure 4:
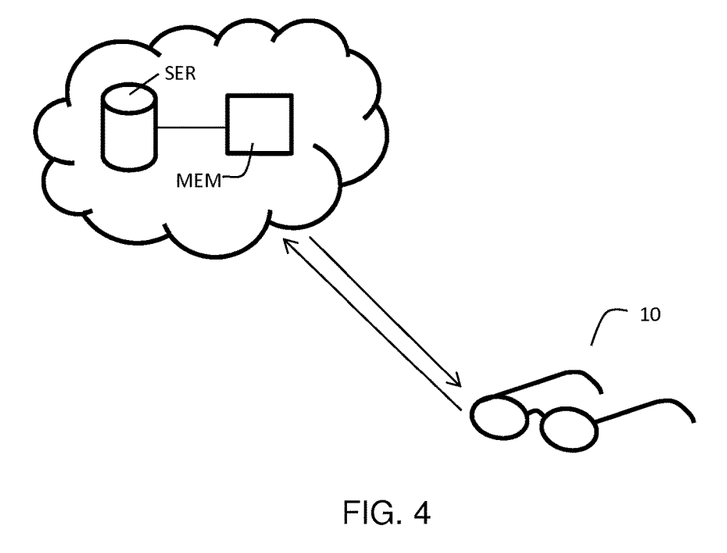
FIG. 4 represents a networked data-processing device according to the invention.

According to an embodiment of the invention, illustrated on FIG. 4, the programmable lens device communicates with a distant entity, for example at a lens design providing side.

Typically, the user data together with information identifying the type of programmable lens device are associated with an identifier and stored in the distance entity memory, for example in a data base.

The programmable lens device sends viewing condition data and/or activity data to the distant entity. The viewing conditions data and/or activity data may be associated with an identifier of the user and/or the programmable lens device. The viewing conditions data and/or activity data are used by the lens designer to determine the best dioptric function, for example the best optical design, based on the different data received or to suggest to the user a change of dioptric function, for example of optical design.

According to an embodiment of the invention, the user data and/or viewing condition data and/or activity data may be stored over time and based on the evolution over time of such data, a more appropriate optical function may be proposed to the wearer.

During the optical function modifying step S5, the optical function of the programmable optical lenses is modified based on the optical function data.

When the optical function data comprise executable file, such as computer program, the computer program is executed by the optical function controller so as to adapt the optical function, for example the dioptric function, of the programmable lens.

When the optical function data comprise dioptric function data, the optical function controller adapts at least the dioptric function of the programmable lens based on the dioptric function data received from the distant entity.

Figure 5:
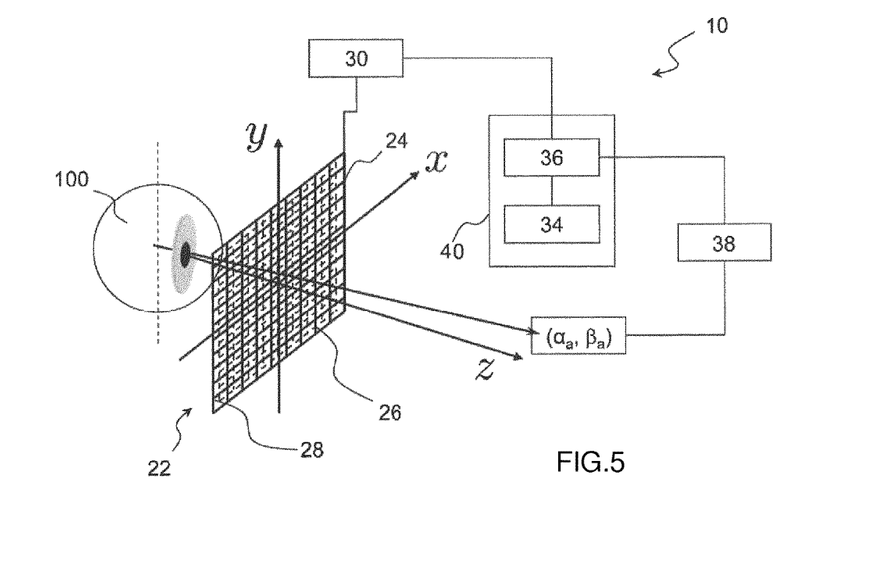
FIG. 5 represents a schematic representation of a programmable lens controlled by the method according to the invention.

An example a programmable lens device whose optical function can be modified is illustrated on FIG. 5.

In FIG. 5, a given gaze direction corresponds to a couple ($\alpha$, $\beta$). It is well-known by the man skilled in the art to define an optical function OF ($\alpha$, $\beta$), adapted to correct visual defects of the wearer in this reference system of coordinates ($\alpha$, $\beta$), i.e. according to each gaze direction of the wearer.

The active system of vision 20 for an eye 100 of a wearer comprises a programmable ophthalmic lens 22. The active system of vision is adapted to be disposed in front of an eye of the wearer.

The programmable ophthalmic lens comprises a transparent set 24 of electroactive cells juxtaposed parallel to a surface of the lens. The set of cells is suitable for providing an optical phase-shift distribution function with a substantially constant value within each cell.

Preferably, each cell 26 is filled with an active electro-material such that the refraction index can vary in each pixel independently from each other under the action of an electric field induced by individual electrodes 28.

The device can be disposed on a face of the transparent set of electroactive cells facing the eye.

Of course, the programmable lens device comprises a device 30 adapted to provide the adapted electric field.

FIG. 5 illustrates a pixelated lens having a plane surface. Nevertheless the surface can be unspecified. Indeed, it is well-known of the man skilled in the art methods to manufacture pixelated ophthalmic lenses having unspecified surfaces.

The sot of cells is suitable for providing an optical phase-shift distribution function with a constant value within each cell.

Furthermore, the active system of vision for an eye of a wearer comprises a receiver 38 adapted to receive, for example via an antenna, optical function data from a distance entity.

Moreover, the programmable lens device further comprises a processor 40 comprising an optical function controller 36 operatively connected to the transparent set of electro active cells and to the device. Thus, the optical function controller 36 is configured to receive electrical signals dependent on the received optical function data of the eye from the receiver 38.

According to an embodiment of the invention, the method can be used to propose adapted optical design to the wearer based on the viewing condition and/or activity data.

For example, the wearer of the optical lens design goes to the see an eye care practitioner. Rather than having the eye care practitioner order a pair of ophthalmic lenses, the method of the invention allows the eye care practitioner to provide a pair of programmable lenses to the wearer.

The wearer's prescription and eventually other parameters relating to the wearer, for example the wearer's morphology, are stored either locally in the memory of the programmable lens device or in a data base associated with a wearer identifier.

The wearer may be provided with an identifier, for example a PIN, that allows him to identify on a distant entity.

If the wearer leaves the eye care practitioner shop walking, the optical design of the programmable lens may be adjusted to provide an optical function most adapted for walking.

Once at home the wearer may wish to read a book. The change of activity between walking outside and reading a book is provided either by the wearer or using the different sensor.

An optical design providing a more adapted optical function can be proposed to the wearer. The more adapted optical design may be determined either by a computer program implemented in the programmable lens device or by a distant entity.

According to a further embodiment of the invention the method of the invention may be used to propose to the wearer to try for a given period of time, for example 2 weeks, a new optical design. After the trial period the wearer may decide to buy the optical design or not.

According to an embodiment of the invention, the programmable lens device further comprises a visual information display device arranged to display visual information over the real word scene viewed by the wearer through the programmable lens when the programmable lens device is used by the wearer. The programmable lens device further comprises a visual information display controller arranged to electronically control the display of the visual information. An example of display device is disclosed in WO2013/012554. The display device disclosed in WO2013/012554 may be adapted to a programmable lenses device as represented on FIG. 1.

According to such embodiment, the method further comprises a display modifying step during which the displayed information is adapted based on the viewing condition data and/or the user data and/or the activity data and/or the optical function data.

For example, based on the activity data the display device may be turned off or used to provide useful information to the wearer.

The wearer may input the information that he is about to drive his car from point A to point B.

The optical function of the programmable lens device may be adapted so as to be particularly well adapted for driving conditions and the display device may be used to provide guiding directions for the wearer.

The programmable lens device may further comprise a location determining application, as GPS application. GPS application can communicate with and provide the location of programmable lens device 10 at any given time. The programmable lens device 10 may employ one or more location determination techniques including, for example, Global Positioning System (GPS) techniques, Cell Global Identity (CGI) techniques, CGI including timing advance (TA) techniques, Enhanced Forward Link Trilateration (EFLT) techniques, Time Difference of Arrival (TDOA) techniques, Angle of Arrival (AOA) techniques, Advanced Forward Link Trilateration (AFTL) techniques, Observed Time Difference of Arrival (OTDOA) techniques, Enhanced Observed Time Difference (EOTD) techniques, Assisted GPS (AGPS) techniques, hybrid techniques (e.g., GPS/CGI, AGPS/CGI, GPS/AFTL or AGPS/AFTL for CDMA networks, GPS/EOTD or AGPS/EOTD for GSM/GPRS networks, GPS/OTDOA or AGPS/OTDOA for UMTS networks), triangulation techniques such as Wi-Fi triangulation techniques, and so forth.

The programmable lens device 10 may be arranged to operate in one or more location determination modes including, for example, a standalone mode, a mobile station (MS) assisted mode, and/or an MS-based mode. In a standalone mode, such as a standalone GPS mode, the programmable lens device 10 may be arranged to autonomously determine its location without real-time network interaction or support. When operating in an MS-assisted mode or an MS-based mode, however, the programmable lens device 10 may be arranged to communicate over a radio access network (e.g., UMTS radio access network) with a location determination entity such as a location proxy server (LPS) and/or a mobile positioning center (MPC).

As illustrated on FIG. 4, the invention further relates to a network system comprising at least a programmable lens device and a distant entity.

The programmable lens device 10 and the distant entity SER are configured so as to communicate one with the other. The distant entity comprising storing means MEM adapted to store at least one computer program product comprising one or more stored sequences of instructions that when executed by the optical function controller of the programmable lens device, causes the optical function controller to adapt the optical function at least according to the wearer's ophthalmic prescription.

The invention has been described above with the aid of embodiments without limitation of the general inventive concept as defined in the claims.

Many modifications and variations will suggest themselves to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method of controlling a programmable lens device comprising a programmable lens and an optical function controller, the programmable lens having an optical function and extending between at least one eye of a wearer and a real world scene when the programmable lens device is used by the wearer, and the optical function controller being arranged to control the optical function of the programmable lens, the method comprising:

an initializing step during which the optical function of the programmable lens device is initialized based on user data comprising at least the wearer's ophthalmic prescription;

an optical function data receiving step during which optical function data relating to the optical function of the programmable lens is received by the optical function controller; and an optical function modifying step during which the optical function of the programmable lens is modified by the optical function controller based on the optical function data.

2. The method according to claim 1, wherein the optical function data comprise a computer program adapted to be executed by the optical function controller and during the optical function modifying step the computer program is executed by the optical function controller so as to modify the optical function of the programmable optical lens.

3. The method according to claim 1, wherein the optical function data comprise at least dioptric function data relating to a dioptric function based at least on an ophthalmic correction adapted to the wearer.

4. The method according to claim 3, wherein the dioptric function data relate a progressive multifocal optical design.

5. The method according to claim 1, wherein the method further comprises:

a viewing condition data receiving step during which viewing condition data relating to the viewing condition of the wearer are received by the optical function controller; and wherein during the optical function modifying step the optical function is modified based on the viewing condition data.

6. The method according to claim 5, wherein the viewing conditions comprise a sighting distance of the wearer.

7. The method according to claim 5, wherein the viewing conditions comprise a proximity of objects in the wearer's environment.

8. The method according to claim 5, wherein the viewing conditions comprise a luminosity of the wearer's environment.

9. The method according to claim 5, wherein the viewing conditions comprise elements relating to a posture of the wearer.

10. The method according to claim 5, wherein the method further comprises:

an activity data receiving step during which activity data relating to the activity of the wearer are received by the optical function controller; and wherein during the optical function modifying step the optical function is modified based on the activity data.

11. The method according to claim 5, wherein the device further comprises:

a visual information display device arranged to display visual information over the real world scene viewed by the wearer through the programmable lens when the programmable lens device is used by the wearer; and a visual information display controller arranged to electronically control the display of the visual information; and wherein the method further comprises a display modifying step during which the displayed information is adapted based on at least one of the viewing condition data, user data, the activity data, and the optical function data.

12. The method according to claim 5, wherein the optical function data are received from a distant entity.

13. The method according to claim 12, wherein at least one of the viewing condition data, activity data, and user data are sent to the distant entity and the optical function data are adapted based on said data.

14. The method according to claim 1, wherein the user data further comprise at least one of morphologic data relating to a morphology of a head of the wearer, viewing strategy data relating to a viewing strategy of the wearer, lens usage, and wearer preferences.

15. A network system comprising at least a programmable lens device and a distant entity, the programmable lens device and the distant entity being configured so as to enable communication between the programmable lens device and the distant entity, and the distant entity configured to store at least one computer program product comprising one or more stored sequences of instructions that when executed by an optical function controller of the programmable lens device, causes the optical function controller being operable to: adapt an optical function at least according to a user's ophthalmic prescription; receive optical function data relating to an optical function of the programmable lens device; and modify the optical function of the programmable lens device, and wherein the distant entity is further configured to store dioptric function data that when used by the optical function controller of the programmable lens device, causes the optical function controller to adapt the optical function at least according to the user's ophthalmic prescription.

16. A computer program product comprising one or more stored sequences of instructions that are accessible to an optical function controller of a programmable lens device, and which, when executed by the optical function controller, causes the optical function controller to adapt an optical function of the programmable lens device to an ophthalmic prescription; receive optical function data relating to an optical function of the programmable lens device; and modify the optical function of the programmable lens device.

* * * * *